(12) United States Patent
Best et al.

(10) Patent No.: US 9,756,486 B2
(45) Date of Patent: Sep. 5, 2017

(54) METHOD, SYSTEM AND APPARATUS FOR INITIATING AND PROCESSING COMMUNICATIONS IN AN INSTANT MESSAGING APPLICATION

(71) Applicant: KIK INTERACTIVE INC., Waterloo (CA)

(72) Inventors: Christopher Best, Waterloo (CA); Michael MacKenzie, Waterloo (CA)

(73) Assignee: KIK INTERACTIVE INC., Waterloo (CA)

( * ) Notice: Subject to any disclaimer, the term of this patent is extended or adjusted under 35 U.S.C. 154(b) by 35 days.

(21) Appl. No.: 14/872,861

(22) Filed: Oct. 1, 2015

(65) Prior Publication Data

US 2017/0099588 A1    Apr. 6, 2017

(51) Int. Cl.
*H04W 4/14* (2009.01)
*H04W 4/24* (2009.01)
*H04W 8/18* (2009.01)

(52) U.S. Cl.
CPC ............. *H04W 4/14* (2013.01); *H04W 4/24* (2013.01); *H04W 8/18* (2013.01)

(58) Field of Classification Search
CPC ............ H04W 4/14; H04W 4/24; H04W 8/18
See application file for complete search history.

(56) References Cited

U.S. PATENT DOCUMENTS

| | | | |
|---|---|---|---|
| 6,868,143 B1* | 3/2005 | Menon | H04M 3/5307 379/67.1 |
| 6,947,723 B1* | 9/2005 | Gurnani | H04M 15/00 379/114.01 |
| 6,990,514 B1* | 1/2006 | Dodrill | G06F 17/30914 707/E17.124 |
| 9,424,341 B2* | 8/2016 | Kleinberger | G06F 17/30634 |
| 2001/0041578 A1* | 11/2001 | Na | H04M 3/5322 455/466 |
| 2005/0254510 A1* | 11/2005 | Oja | H04L 65/1069 370/431 |

* cited by examiner

*Primary Examiner* — Christopher M Brandt
(74) *Attorney, Agent, or Firm* — Perry + Currier Inc.

(57) ABSTRACT

A method is provided of initiating communications, comprising: storing, in a memory at a messaging server, a plurality of subscriber records, each subscriber record containing a subscriber identifier and a subscriber type indicator; a first subset of the subscriber records having a first subscriber type indicator, and a second subset of the subscriber records having a second subscriber type indicator; determining, at the messaging server, whether to generate initiation data; when the determination is affirmative: selecting at least one of the second subset of the subscriber records; generating the initiation data, the initiation data including at least the subscriber identifier of the selected subscriber record; and transmitting the initiation data to a computing device corresponding to at least one of the first subset of subscriber records.

20 Claims, 10 Drawing Sheets

METHOD, SYSTEM AND APPARATUS FOR INITIATING AND PROCESSING COMMUNICATIONS IN AN INSTANT MESSAGING APPLICATION

FIELD

The specification relates generally to messaging applications, and specifically to a method, system and apparatus for initiating and processing communications in an instant messaging application.

BACKGROUND

Communications services, such as instant messaging applications, may be employed by a variety of users (e.g. individuals, businesses, and the like). The ability of two users to exchange messages in such services generally requires at least one of the users to input an account name or other identifier of the other user. Searching for such account names to initiate communications can be an inefficient process.

Further, certain types of users, such as businesses operating accounts on communications services, may receive a substantial volume of incoming message traffic. Processing and responding to such traffic can be computationally demanding, and make inefficient use of available computational resources.

SUMMARY

According to an aspect of the specification, a method is provided of initiating communications, comprising: storing, in a memory at a messaging server, a plurality of subscriber records, each subscriber record containing a subscriber identifier and a subscriber type indicator; a first subset of the subscriber records having a first subscriber type indicator, and a second subset of the subscriber records having a second subscriber type indicator; determining, at the messaging server, whether to generate initiation data; when the determination is affirmative: selecting at least one of the second subset of the subscriber records; generating the initiation data, the initiation data including at least the subscriber identifier of the selected subscriber record; and transmitting the initiation data to a computing device corresponding to at least one of the first subset of subscriber records.

According to another aspect of the specification, a messaging server is provided, comprising: a memory storing a plurality of subscriber records, each subscriber record containing a subscriber identifier and a subscriber type indicator; a first subset of the subscriber records having a first subscriber type indicator, and a second subset of the subscriber records having a second subscriber type indicator; a network interface; and a processor interconnected with the memory and the network interface, the processor configured to: determine whether to generate initiation data; when the determination is affirmative: select at least one of the second subset of the subscriber records; generate the initiation data, the initiation data including at least the subscriber identifier of the selected subscriber record; and transmit the initiation data to a computing device corresponding to at least one of the first subset of subscriber records.

BRIEF DESCRIPTIONS OF THE DRAWINGS

Embodiments are described with reference to the following figures, in which.

DETAILED DESCRIPTION OF THE EMBODIMENTS

Figure 1:
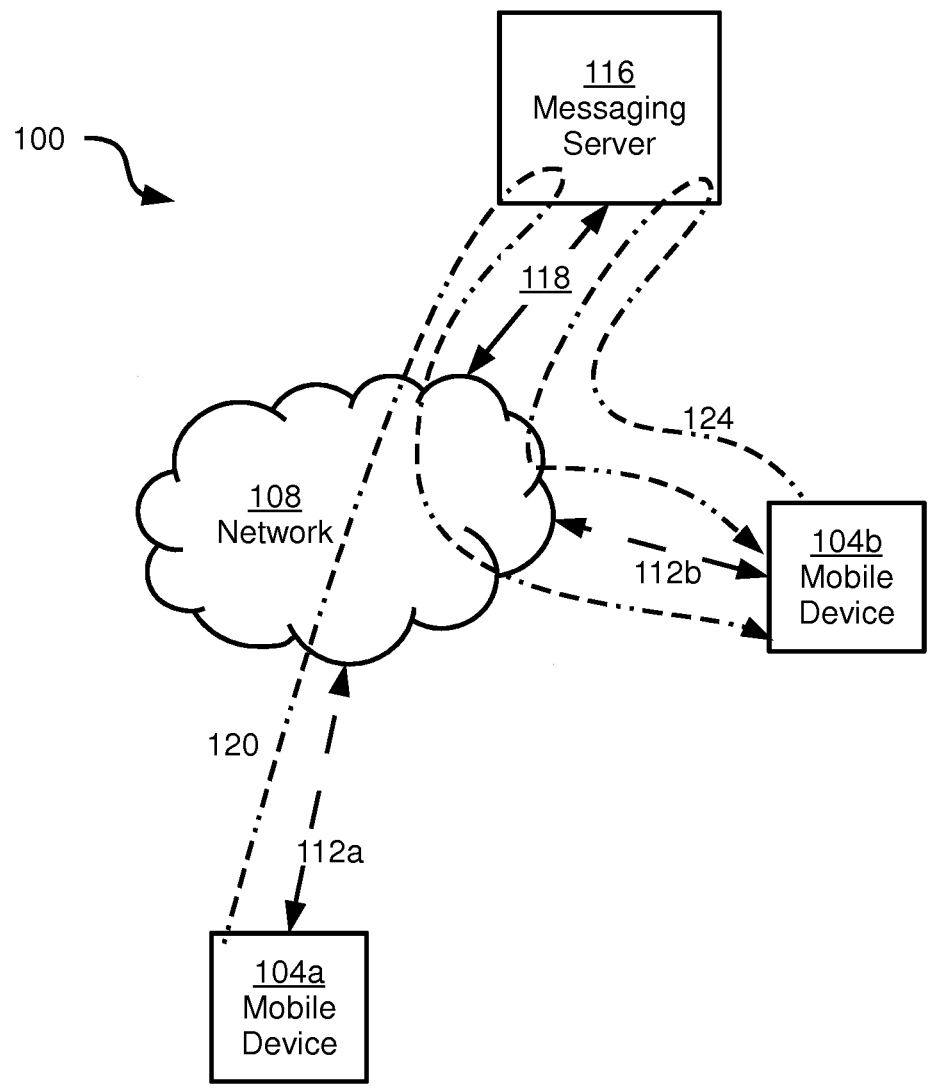
FIG. 1 depicts a communications system, according to a non-limiting embodiment.

FIG. 1 depicts a communications system 100. System 100 includes a plurality of mobile computing devices, of which two examples 104a and 104b are shown (referred to generically as a mobile computing device 104 or a device 104, and collectively as mobile computing devices 104 or devices 104). Additional mobile computing devices (not shown) can be included in system 100. Each mobile computing device 104 can be any of a cellular phone, a smart phone, a tablet computer, and the like.

Mobile computing devices 104a and 104b are connected to a network 108 via respective links 112a and 112b, which are illustrated as wireless links but can also be wired links, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks, WiMax networks and the like.

Via network 108, mobile computing devices 104 can communicate with a messaging server 116 connected to network 108 via a link 118. Messaging server 116 provides a messaging service to mobile computing devices 104. For example, mobile computing device 104a can execute a messaging application for sending and receiving messages to and from messaging server 116. In the embodiments discussed herein, the messages sent and received by devices 104 are instant messages (IM, e.g. Internet Protocol-based messages). In other embodiments, the messages can include any suitable combination of IM, Short Message Service (SMS) messages, Multimedia Messaging Service (MMS) messages and the like.

Messaging server 116 stores associations between messaging service subscriber identifiers (e.g. account names) and identifiers of mobile computing devices 104 such as IP addresses, MAC addresses and the like. Messaging server 116 can therefore receive a message from a device 104 (e.g. a message sent from device 104*a* and addressed to the subscriber identifier associated with device 104*b*), look up the device identifier of the addressee (e.g. device 104-*b*) based on the subscriber identifier contained in the message, and route the message via network 108 to the addressee (e.g. device 104*b*), as shown by a message path 120. As will be discussed below in greater detail, messaging server 116 can also route certain messages to other servers, or internally for further processing at server 116 itself.

Messaging server 116 is also configured to respond to certain messages autonomously. In other words, messaging server 116 can be configured to operate as a chatbot by automatically responding to messages received from mobile computing devices 104. For example, as shown in FIG. 1 by a message path 124, device 104*b* transmits a message to messaging server 116 and messaging server 116 generates and returns a response to device 104*b* via network 108.

In addition to the routing and autonomous response functionalities mentioned above, messaging server 116 is configured to perform certain actions to efficiently initiate communications (e.g. exchanges of instant messages) between subscribers in system 100, and to perform additional processing on such communications. In order to perform these actions, as will be discussed in greater detail below, messaging server 116 stores subscriber type indicators in connection with each of the above-mentioned subscriber identifiers.

Before a detailed discussion of the operation of system 100 is provided, certain components of a mobile computing device 104 (which, as noted earlier, refers generically to any of devices 104*a* and 104*b*) and messaging server 116 will be described with reference to FIG. 2.

Figure 2:
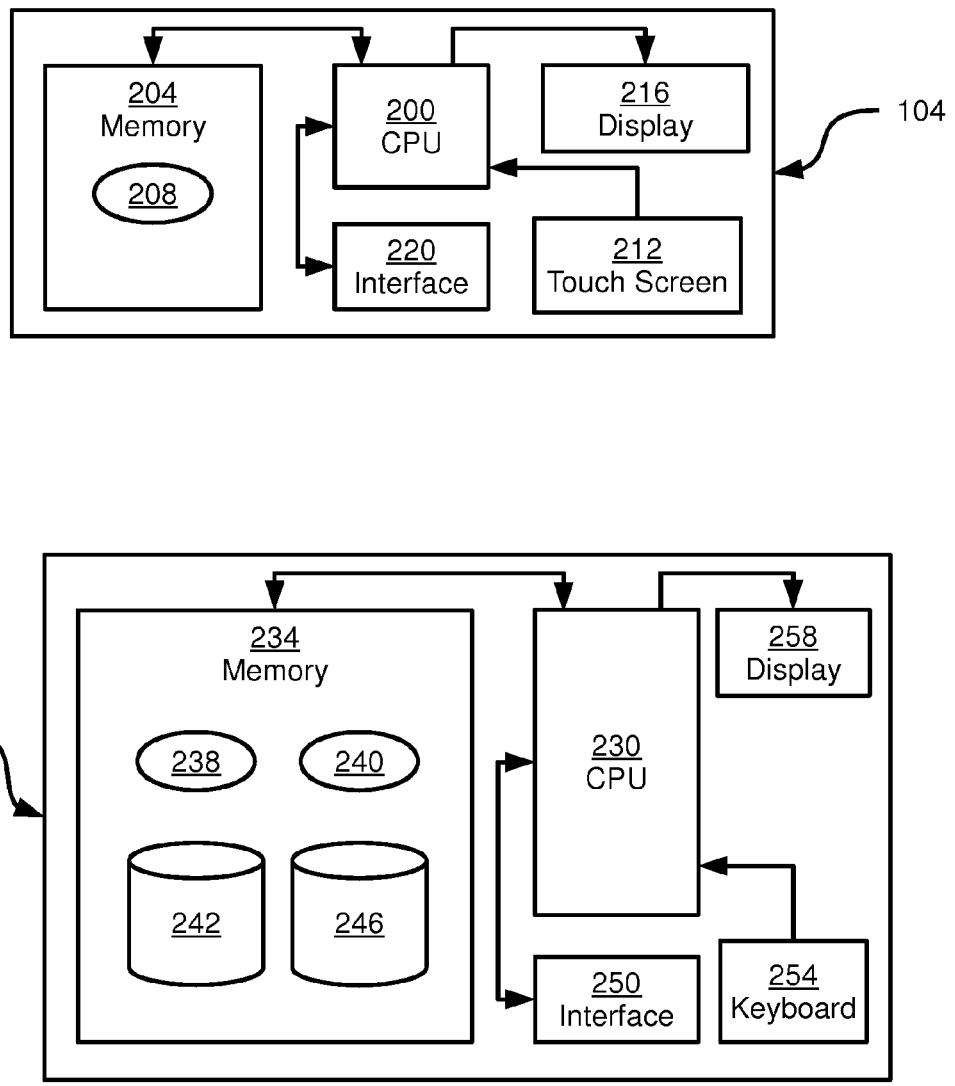
FIG. 2 depicts certain internal components of a mobile device and a messaging server of the system of FIG. 1, according to a non-limiting embodiment.

Referring now to FIG. 2, mobile computing device 104 includes a central processing unit (CPU) 200, also referred to herein as processor 200, interconnected with a memory 204. Memory 204 stores computer readable instructions executable by processor 200, including a messaging application 208. Processor 200 and memory 204 are generally comprised of one or more integrated circuits (ICs), and can have a variety of structures, as will now occur to those skilled in the art (for example, more than one CPU can be provided). Processor 200 executes the instructions of messaging application 208 to perform, in conjunction with the other components of mobile computing device 104, various functions related to exchanging messages with messaging server 116.

Mobile computing device 104 also includes input devices interconnected with processor 200, in the form of a touch screen 212. Mobile computing device 104 can also include other input devices, such as any suitable combination of a camera, a microphone, a GPS receiver, and the like (not shown). Mobile computing device 104 also includes output devices interconnected with processor 200, including a display 216 integrated with touch screen 212. Other output devices can also be provided, such as a speaker (not shown). Mobile computing device 104 also includes a network interface 220 interconnected with processor 200, which allows mobile computing device 104 to connect to network 108 via a link 112 (e.g. link 112*a*, for device 104*a*). Network interface 220 thus includes the necessary hardware, such as radio transmitter/receiver units, network interface controllers and the like, to communicate over a link 112.

Messaging server 116 includes a central processing unit (CPU) 230, also referred to herein as processor 230, interconnected with a memory 234. Memory 234 stores computer readable instructions executable by processor 230, including a routing application 238 and a promotion application 240. Processor 230 and memory 234 are generally comprised of one or more integrated circuits (ICs), and can have a variety of structures, as will now occur to those skilled in the art (for example, more than one CPU can be provided). Processor 230 executes the instructions of applications 238 and 240 to perform, in conjunction with the other components of messaging server 116, various functions related to receiving and responding to messages from mobile computing devices 104. In the discussion below of those functions, messaging server 116 is said to be configured to perform those functions—it will be understood that messaging server 116 is so configured via the processing of the instructions in applications 238 and 240 by the hardware components of messaging server 116 (including processor 230 and memory 234).

Memory 234 also stores a subscriber database 242, which contains data defining various subscriber records, as will be discussed below in greater detail. Also stored in memory 234 is an autonomous messaging database 246, which contains data defining responses for use when server 116 operates as a chatbot, as well as additional parameters to be discussed herein.

Messaging server 116 also includes a network interface 250 interconnected with processor 230, which allows messaging server 116 to connect to network 108 via link 118. Network interface 250 thus includes the necessary hardware, such as network interface controllers and the like, to communicate over link 118. Messaging server 116 also includes input devices interconnected with processor 230, such as a keyboard 254, as well as output devices interconnected with processor 230, such as a display 258. Other input and output devices (e.g. a mouse, speakers) can also be connected to processor 230. In some embodiments (not shown), keyboard 254 and display 258 can be connected to processor 230 via network 108 and another computing device. In other words, keyboard 254 and display 258 can be local (as shown in FIG. 2) or remote.

Having described certain internal components of devices 104 and server 116, the actions performed by devices 104 and server 116 will be discussed in greater detail.

Figure 3:
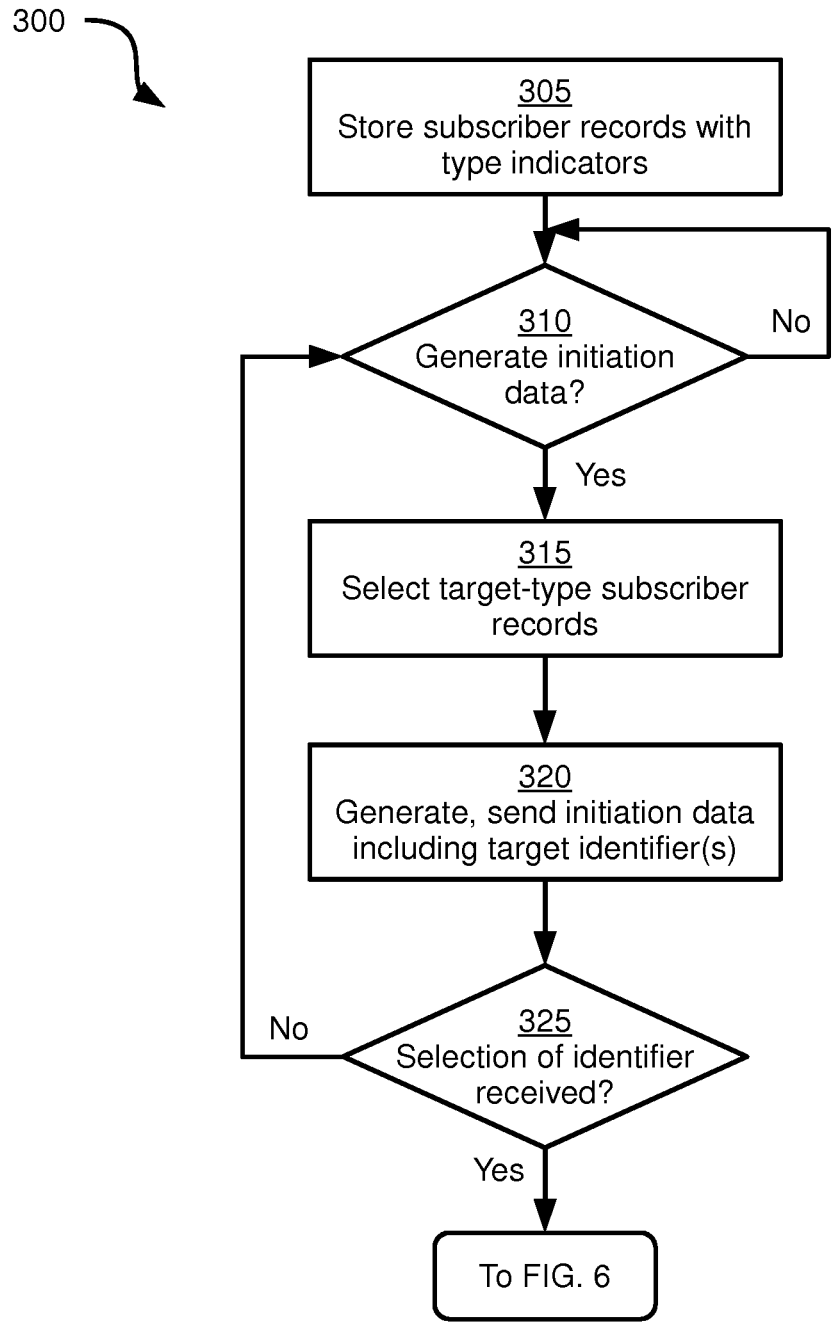
FIG. 3 depicts a method of initiating communications in the system of FIG. 1, according to a non-limiting embodiment.

Turning to FIG. 3, a method 300 of initiating communications in an instant messaging service is depicted. Method 300 will be described below in connection with its performance in system 100, and particularly by server 116, via the execution of application 240 by processor 230.

At block 305, server 116 is configured to store a plurality of subscriber records in database 242. In general, each subscriber record defines a distinct destination for messages (e.g. the above-mentioned instant messages) sent by devices 104 and server 116 via the above-mentioned autonomous response functionality. An example of database 242 is shown below in Table 1.

TABLE 1

Example Subscriber Database 242

| Subscriber Identifier | Subscriber Type | Routing | Contact IDs | Account Balance |
|---|---|---|---|---|
| Alice | Initiator | 104a | Acme_Inc | 0 |
| Bob | Initiator | 104b | | 0 |
| Acme_Inc | Target | 116 | Alice | N/A |
| . . . | . . . | . . . | . . . | . . . |

As seen in Table 1, database 242 includes a plurality of subscriber records, each identifying an addressee to which instant messages can be directed. Each subscriber record includes a unique subscriber identifier employed to address messages within the instant messaging service provided by server 116. Each subscriber record also includes routing information corresponding to the subscriber identifier. As mentioned earlier, the routing information identifies the physical destination (e.g. an IP address of a mobile device 104) to which messages addressed to the corresponding subscriber identifier are routed by server 116. In the present example, messages addressed to the subscriber "Alice" are routed to device 104*a*. The routing information can include any of a variety of suitable device identifiers, including IP addresses, MAC addresses, and the like. As seen in Table 1, some subscriber records, such as the record for the subscriber "Acme", can route incoming messages to server 116 itself—that is, messages need not be routed to mobile devices 104.

The subscriber identifier and routing information permit server 116 to receive and route messages via the execution of routing application 238. In addition, each subscriber record in database 242 includes a subscriber type indicator. As noted earlier, server 116 can perform various actions to initiate message exchanges between subscribers in system 100. For each pair of subscribers that begin exchanging messages, one subscriber will initiate the exchange (i.e. send the first message of the exchange), and the other will be the target of the initiation. The actions performed by server 116 in initiating message exchanges include sending certain data to subscribers; as will be seen below, which data is sent to which subscribers to initiate communications depends in part on the subscriber type indicators of those subscribers.

The subscriber type indicators thus divide the subscriber records in database 242 into "initiator" records and "target" records. For example, the target records may define subscribers operated by commercial entities (e.g. a clothing brand) that wish to prompt other subscribers (initiators) to initiate communications with them. The initiator records, meanwhile, may define subscribers operated by individuals that are potential customers of the commercial entities.

Although the terms "initiator" and "target" are used in Table 1, it is contemplated that a wide variety of other subscriber type indicators can be stored in database 242 to divide the subscriber records therein into the above-mentioned subsets. For example, a binary value can be employed, with "1" indicating that the subscriber is an initiator, and "0" indicating that the subscriber is a target.

Each record in database 242 can also include one or more contact identifiers. The contact identifiers contained in a given subscriber record are the subscriber identifiers of other subscribers with which the given subscriber has previously engaged in communications. In the example of Table, 1 it can be seen that the subscribers "Alice" and "Acme" have previously exchanged messages with each other, while the subscriber "Bob" has not previously exchanged messages with another subscriber.

In addition, each record in database 242 can include an account balance. The nature of the account balance is not particularly limited. For example, the account balance can represent a monetary balance, a balance of points (such as loyalty points), or any of a variety of other currencies. In the present example, only subscriber records having the type indicator "standard" include account balances. The records in database 242 can also include other information not shown in Table 1, including, for example, a profile image for each subscriber record.

At block 310, server 116 is configured to determine whether to generate initiation data for transmission to at least one subscriber. In general, initiation data includes data that is suitable for display at one or more mobile devices 104 (each corresponding to a subscriber record), and includes at least one selectable element whose selection causes the mobile devices to initiate communications with a particular subscriber.

In some embodiments, the determination at block 310 is a determination of whether a request for initiation data has been received from a mobile device 104, such as mobile device 104*b*. As will be apparent below, server 116 can perform multiple instances of block 310 and the subsequent blocks of method 300 for different mobile devices 104.

Figure 4A:
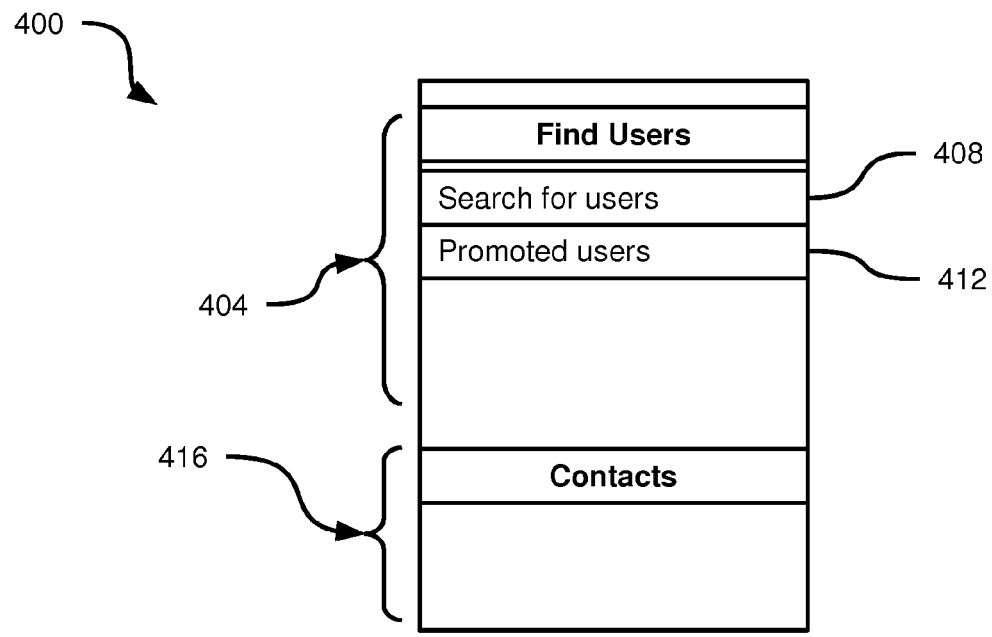
FIGS. 4A and 4B depict example interfaces displayed by a mobile device of the system of FIG. 1 during the performance of the method of FIG. 3, according to a non-limiting embodiment.

The nature of the request from mobile device 104*b* (or any other mobile device 104) is not particularly limited. For example, the request may be sent by mobile device 104*b* in response to selection of a selectable interface element at mobile device 104*b*. Turning to FIG. 4A, mobile device 104*b* can be configured to present an interface 400 on display 216 via the execution of application 208. Interface 400, which can be the initial or "home" screen of application 208, can include a first region 404 displaying a first selectable option 408 whose selection (e.g. via touch screen 212) causes mobile device 104*b* to display a search window (not shown). First region 404 also includes a second selectable option 412 whose selection (e.g. via touch screen 212) causes mobile device 104*b* to request a list of target subscribers from server 116. Interface 400 can also include a second region 416 displaying the contacts of the subscriber corresponding to device 104*b* (currently empty, as the subscriber "Bob" has no contacts stored in database 242). The determination at block 310 can therefore include a determination of whether a request for a list of target subscribers has been received from device 104*b*.

In some embodiments, device 104*b* can be configured to present a different interface on display 216 via the execution of application 208. For example, referring to FIG. 4B, a further interface 450 is illustrated. Interface 450 includes regions 404 and 416 as described above. However, interface 450 also includes a third region 420 containing an advertisement field 424. Device 104*b*, upon (or prior to) presenting interface 450, can be configured to automatically send a request to server 116 for an advertisement to fill field 424. The determination at block 310 can therefore include a determination of whether an automated request for an advertisement has been received from device 104*b*.

When the determination at block 310 is negative (e.g. no request has been received from device 104*b*), the performance of method 300 remains at block 310. When, on the other hand, the determination at block 310 is affirmative, the performance of method 300 proceeds to block 315.

At block 315, in response to a positive determination at block 315, server 116 selects at least one target-type subscriber record (that is, a record having the subscriber type indicator "target" or any suitable equivalent indicator). The number of subscriber records selected, and which records are selected, depends in part on the event resulting in the affirmative determination at block 310. For example, when the event was a request from device 104*b* generated via selection of the "promoted users" element 412 shown in FIG. 4A, server 116 can be configured to select a plurality of, or even all, target-type subscribers from database 242. In other examples, when the event was a request for an advertisement received from device 104*b*, server 116 can be configured to select a single target-type subscriber from database 242.

When the selection at block 315 is not a selection of a subset of the available target-type subscribers in database 242, which subset is selected can depend on a variety of factors. For example, server 116 can also store in database 242 a location associated with each initiator-type subscriber. Such locations can be, for example, reported by devices 104. Target-type subscriber records in database 242 can include preferred locations, and at block 315 server 116 can be configured to select the target-type subscribers whose preferred locations most closely match the current location of the mobile device 104 (device 104b, in the present example) whose request led to the performance of block 315. In other embodiments, database 242 can also contain other demographic data (e.g. age, gender and the like) for initiator-type subscribers, as well as corresponding demographic preferences for target-type subscribers. Server 116 can be configured to match such demographic data and demographic preferences to select target-type subscribers at block 315 based on the subscriber whose request caused the affirmative determination at block 310.

Continuing with the examples mentioned earlier, when the device request was generated via the selection of element 412 (as discussed in connection with FIG. 4A), server 116 can be configured to select all available target-type subscribers in database 242. When the device request was generated via the presentation of advertisement field 424 (as discussed in connection with FIG. 4B), server 116 can be configured to select a single target-type subscriber.

Having selected at least one target-type subscriber at block 315, at block 320 server 116 is configured to generate and send initiation data to a mobile device 104. In particular, the initiation data is sent to the mobile device 104 whose request led to the affirmative determination at block 310 (that is, device 104b in the present example).

The initiation data includes at least the subscriber identifier of each target-type subscriber record selected at block 315. The initiation data can also include other data, such as the above-mentioned profile images. The initiation data can also include an instruction for causing application 208 to initiate a message exchange upon selection of the initiation data at mobile device 104b.

Figure 5A:
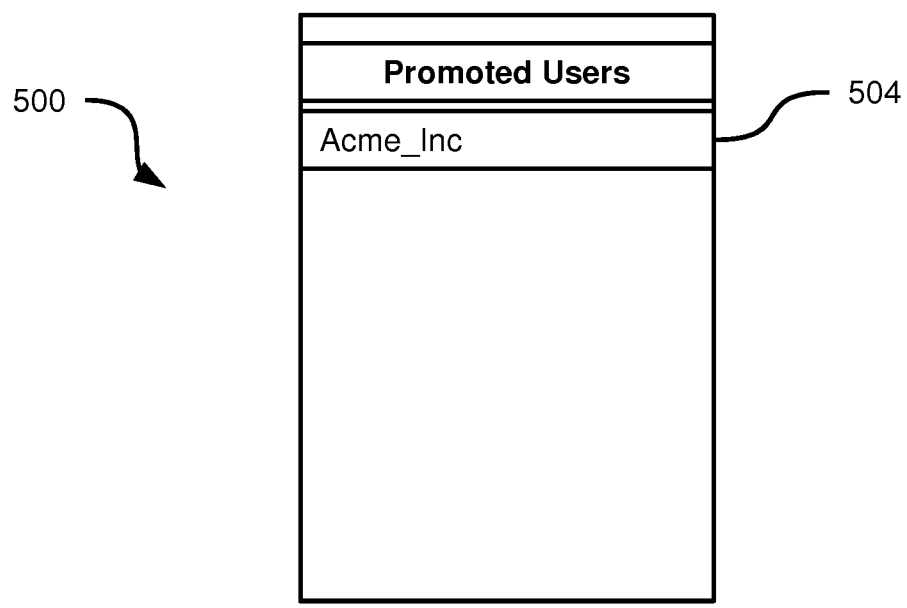
FIGS. 5A and 5B depict additional example interfaces displayed by a mobile device of the system of FIG. 1 during the performance of the method of FIG. 3, according to a non-limiting embodiment.
Figure 5B:
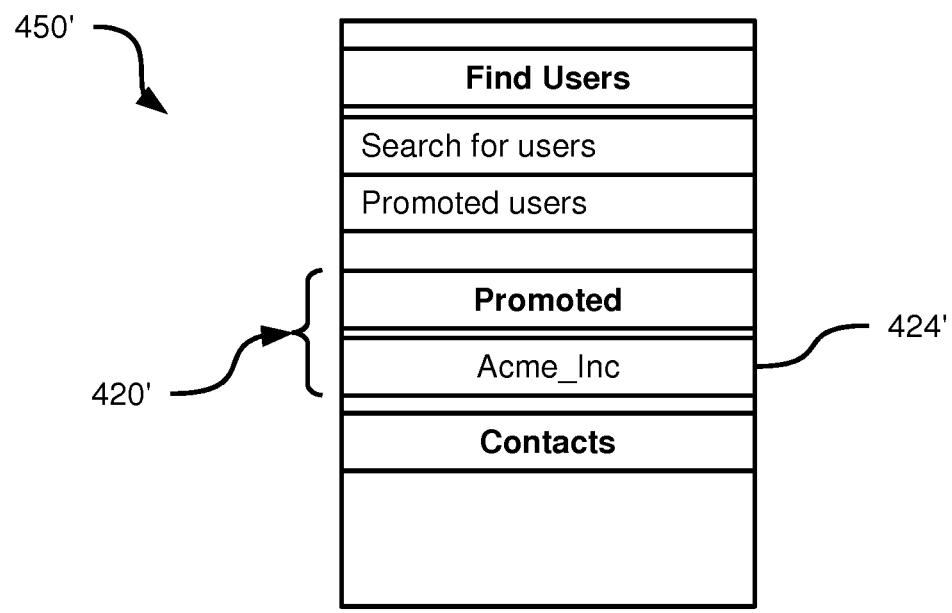

Turning now to FIGS. 5A and 5B, the outcome of two alternative performances of block 320 are illustrated. FIG. 5A illustrates the result, at device 104b, of the performance of block 320 following the selection of element 412 from FIG. 4A. In particular, the selection of element 412 causes device 104b (via execution of application 208) to present a further interface 500 in which a listing of target-type subscribers is presented. The target-type subscribers presented in interface 500 are received from server 116 following their selection and transmittal by server 116 at blocks 315 and 320. As seen in FIG. 5A, interface 500 includes a selectable element 504 identifying the target-type subscriber Acme_Inc. Element 504 is selectable for initiating an exchange of messages with Acme_Inc, as will be described below in greater detail. Thus, the initiation data received at device 104b from server 116 also included an instruction to render the initiation data as a selectable element.

Figure 4B:
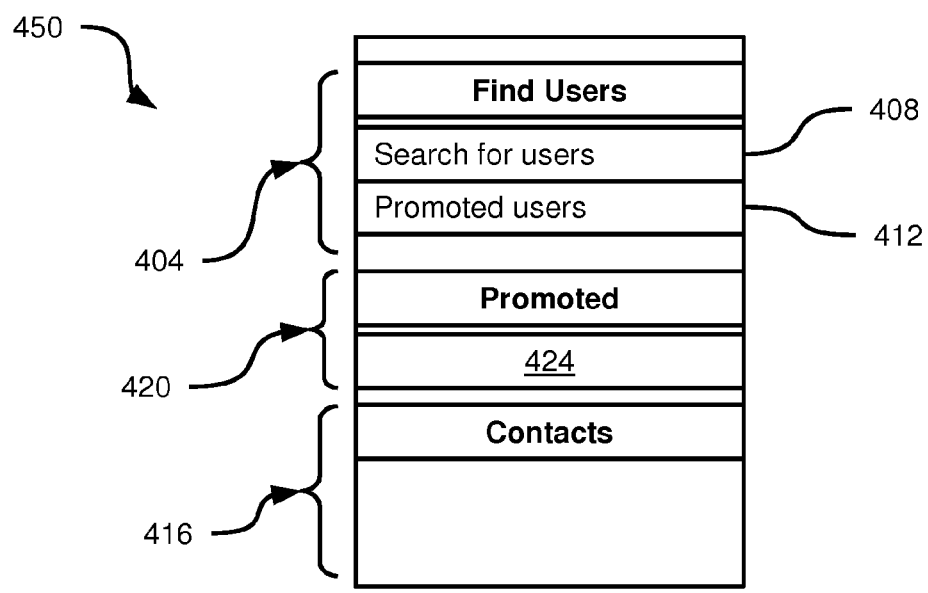

Turning to FIG. 5B, an example result of the advertisement request discussed in connection with FIG. 4B is illustrated. In particular, an updated interface 450' is shown, in which an updated region 420' includes an updated advertisement field 424'. In contrast to field 424 shown in FIG. 4B, field 424' includes an identifier of the target-type subscriber Acme_Inc, which is selectable (e.g. via touch screen 212) to initiate an exchange of messages between the subscribers Bob and Acme_Inc.

Referring briefly to FIG. 3, following the performance of block 320, server 116 is configured to determine, at block 325, whether a selection of a subscriber identifier has been received from a device 104. When the determination at block 325 is negative, the performance of method 300 returns to block 310. When the determination at block 325 is affirmative, however, server 116 is configured to perform additional actions, as shown in FIG. 6.

Figure 6:
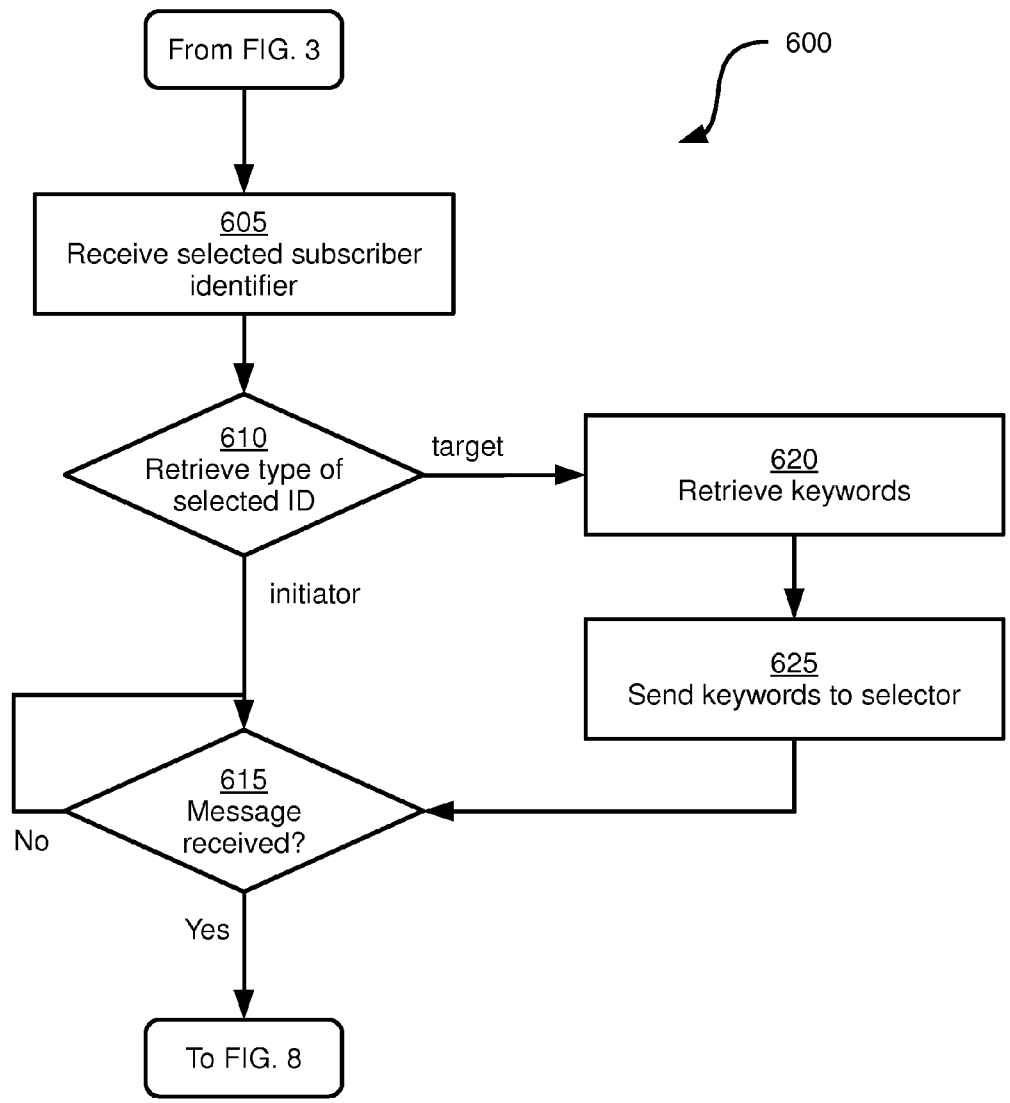
FIG. 6 depicts a further method of initiating communications in the system of FIG. 1, according to a non-limiting embodiment.

Referring now to FIG. 6, a further method 600 of initiating communications in an instant messaging service is depicted. Method 600 will be described below in connection with its performance in system 100, and particularly by server 116, via the execution of application 240 by processor 230. The performance of method 600 as described below follows the performance of method 300. However, in other embodiments method 600 can be performed independently of method 300.

At block 605, server 116 is configured to receive a message from a device 104 indicating that a subscriber identifier has been selected at that device 104 for initiating an exchange of instant messages. For example, the message received at block 605 can be sent by device 104b following the selection of element 504 in FIG. 5A, or field 424' in FIG. 5B.

Following the receipt of the selected subscriber identifier, server 116 is configured to retrieve the subscriber type indicator of the selected subscriber identifier. In particular, server 116 is configured to retrieve the type indicator from database 242. Therefore, continuing with the present example performance of method 600, server 116 is configured to retrieve the subscriber type indicator corresponding to the subscriber identifier Acme_Inc.

From block 610, server 116 is configured to proceed to block 615 when the subscriber type indicator of the selected subscriber is "initiator". At block 615, server 116 simply awaits the receipt of a message addressed to a subscriber before proceeding to message handling functionality described below in connection with FIG. 8.

Server 116 is also configured to proceed to block 620 rather than block 615 when the type indicator retrieved at block 610 is "target". At block 620, server 116 is configured to retrieve at least one keyword corresponding to the selected subscriber identifier from autonomous messaging database 246. An example of database 246 is shown below, in Table 2.

TABLE 2

Example Autonomous Messaging Database 246

| Subscriber identifier | Keywords | Responses |
|---|---|---|
| Acme_Inc | anvil | What kind of anvil do you need? |
| | dynamite | Sorry, we're all out of dynamite |

As seen above, database 246 contains a record corresponding to each target-type subscriber defined in database 242. Therefore, a single record is shown in Table 2, corresponding to the subscriber Acme_Inc. In addition to the subscriber identifier, database 246 can include one or more keywords corresponding to the subscriber identifier, and one or more response messages corresponding to each keyword. The processing of response messages will be described later herein. At block 620, server 116 is configured to retrieve the keywords associated with the subscriber Acme_Inc (that is, the keywords "anvil" and "dynamite"). At block 625, server 116 is configured to transmit the selected keywords to the device from which the selection at block 605 was received (device 104b, in the present example). Following the performance of block 625, server 116 is configured to await the receipt of a message addressed to a subscriber at block 615.

Figure 7A:
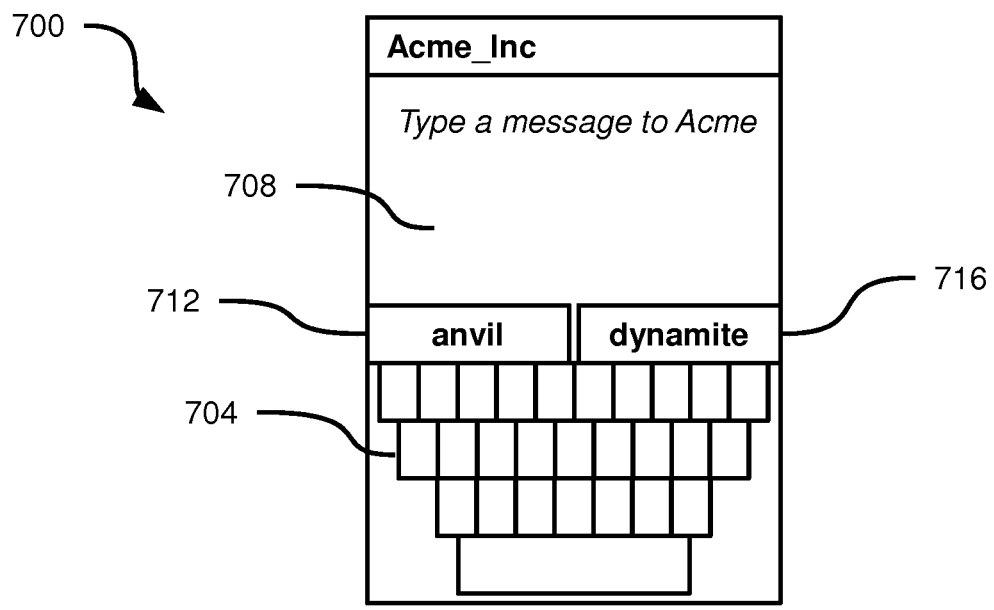
FIGS. 7A and 7B depict example interfaces displayed by a mobile device of the system of FIG. 1 during the performance of the method of FIG. 6, according to a non-limiting embodiment.
Figure 7B:
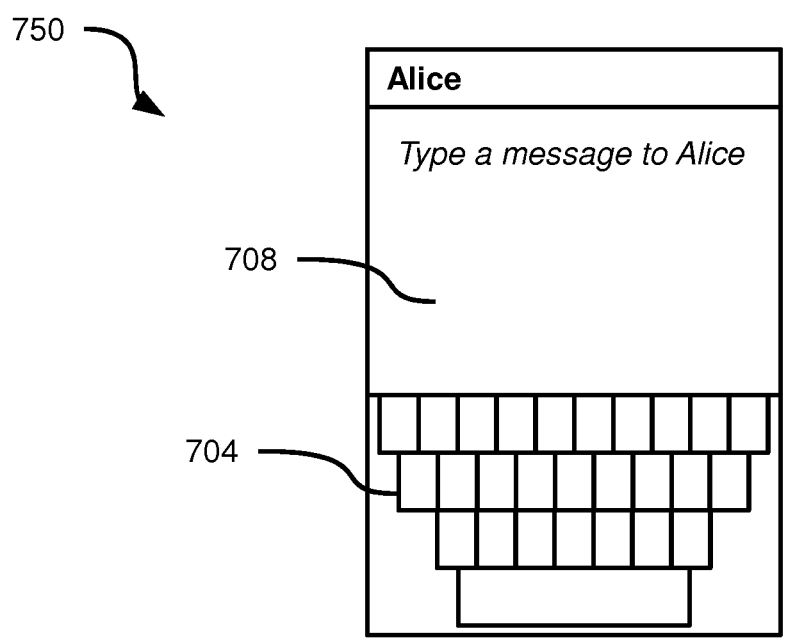

Turning to FIGS. 7A and 7B, illustrations of the results of method 600 are provided. FIG. 7A depicts an interface 700 presented by device 104*b* on display 216 following the selection of, for example, element 504 shown in FIG. 5A. Interface 700 includes a virtual keyboard 704 for typing a message in a message area 708. Interface also includes selectable keyword elements 712 and 716, displaying the keywords received from server 116. Elements 712 and 716 are selectable at device 104*b* to insert the corresponding keywords into a message in area 708 (without the need to type the keywords via virtual keyboard 704).

In contrast, FIG. 7B depicts an interface 750 presented at device 104*b* for composing a message to the subscriber Alice rather than the subscriber Acme_Inc. Since Alice is an initiator-type subscriber, server 116 did not select and send any keywords to device 104*b* through the performance of method 600. Therefore, while interface 750 includes virtual keyboard 704 and message composition area 708, interface 750 does not include any selectable keyword elements, because no keywords were received at device 104*b* from server 116.

As noted earlier, following the provision of keywords to mobile device 104*b*, server 116 is configured to await the receipt of a message from device 104*b* for delivery to another subscriber. The process of receiving, routing and responding to messages will now be discussed in connection with FIG. 8.

Figure 8:
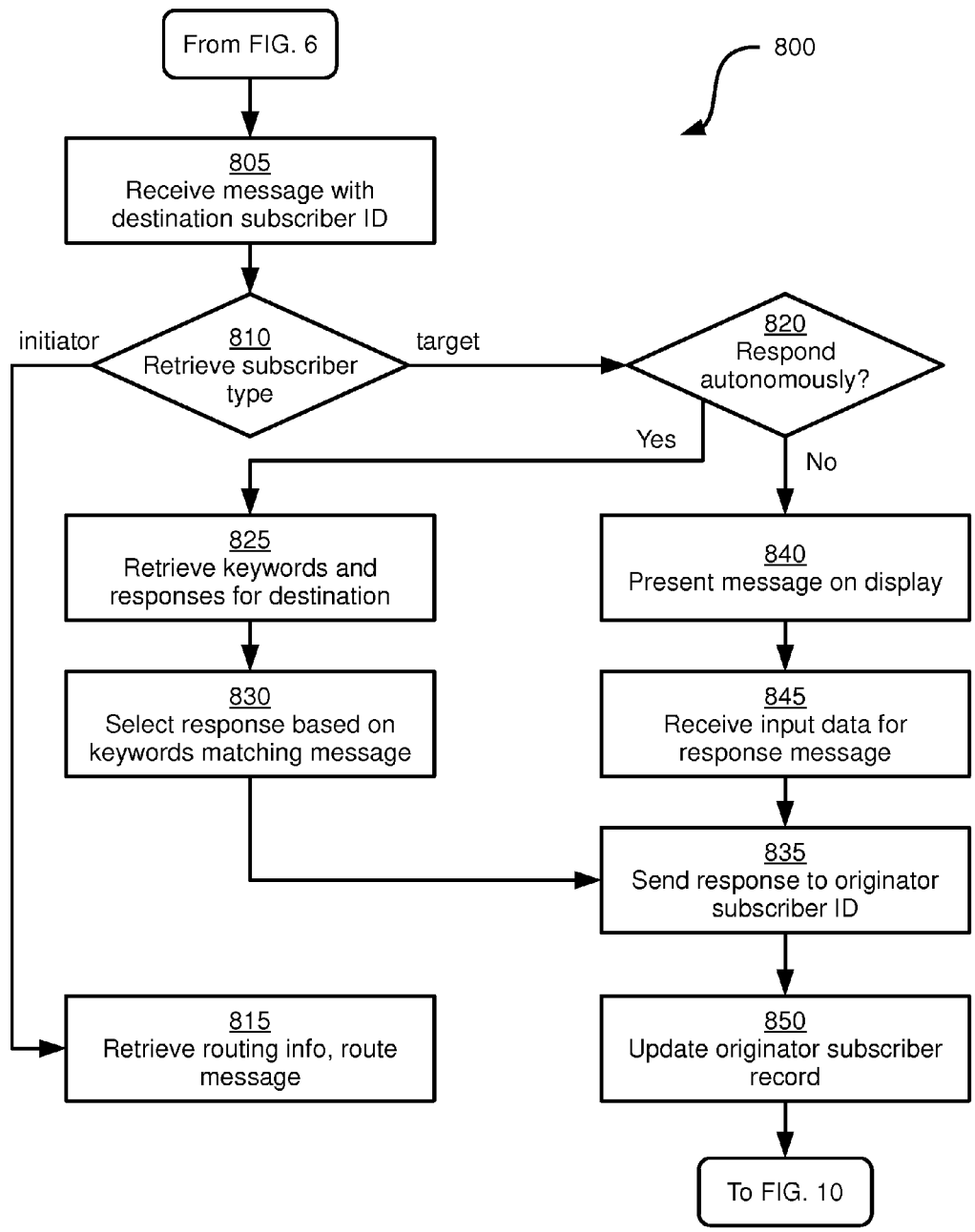
FIG. 8 depicts a method of processing communications in the system of FIG. 1, according to a non-limiting embodiment.

FIG. 8 depicts a method 800 of processing communications, such as instant messages. Method 800 will be described in connection with its performance in system 100, and particularly by server 116. As illustrated in FIG. 8, method 800 can follow a performance of method 600. However, it is contemplated that methods 600 and 800 can also be performed independently, and method 600 need not be implemented in order to implement method 800.

Figure 9:
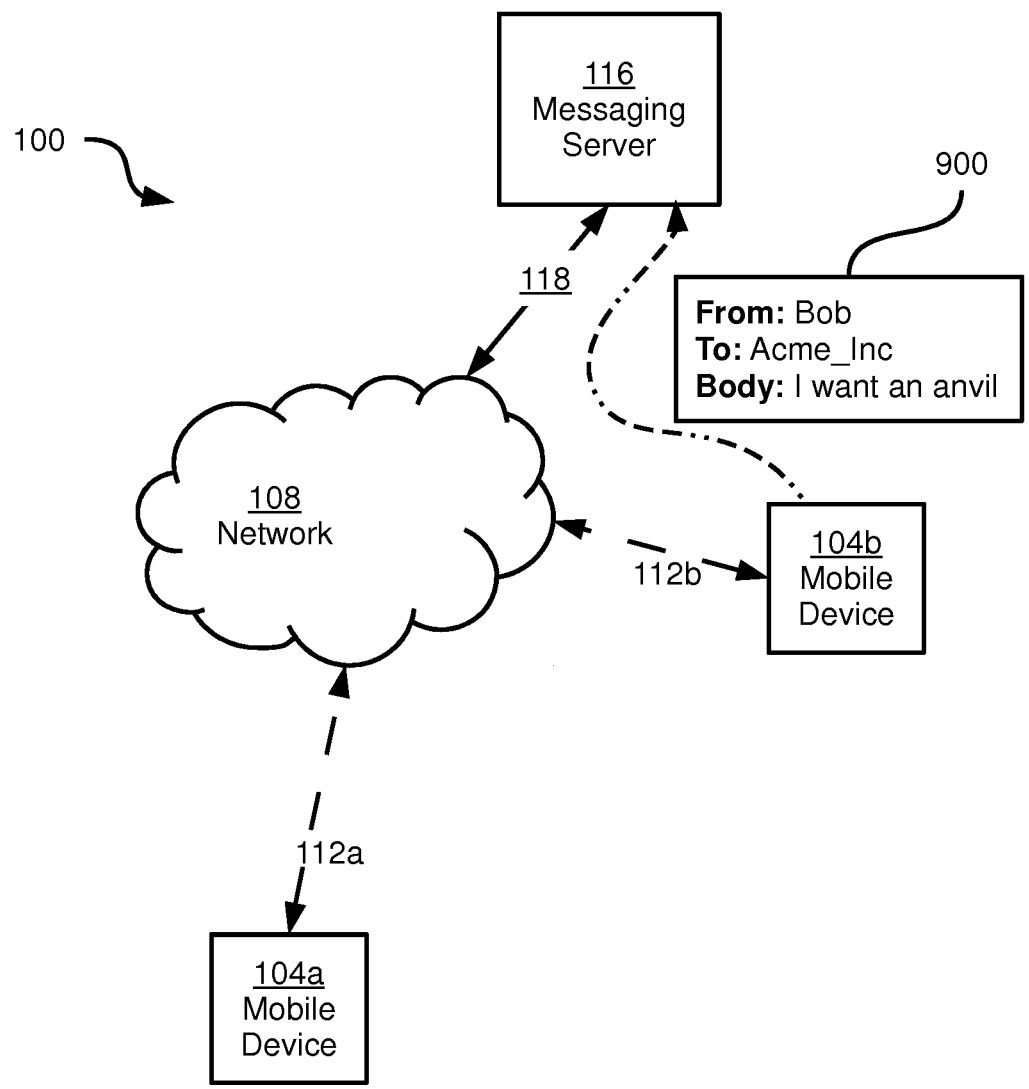
FIG. 9 depicts the system of FIG. 1 during the performance of the method of FIG. 8, according to a non-limiting embodiment.

At block 805, server 116 is configured to receive a message, such as an instant message, from a mobile device 104. The message contains at least a destination subscriber identifier (i.e. an addressee). The message can also contain an originator subscriber identifier and a message body, which can include image data, text, or both image data and text. For example, referring to FIG. 9, an example message 900—addressed to the subscriber Acme_Inc—is shown being transmitted from mobile device 104*b* to server 116, via network 108.

Upon receipt of the message at block 805, server 116 can be configured to insert the subscriber identifier of the message's originator into the contacts field of database 242 for the message's destination subscriber.

Returning to FIG. 8, responsive to receiving the message, server 116 is configured to retrieve the subscriber type indicator of the destination subscriber identifier in the message. Thus, in the present example, server 116 is configured to retrieve, from database 242, the type indicator of Acme_Inc. When the subscriber type indicator is "initiator", the performance of method 800 proceeds to block 815, at which routing information is retrieved from database 242 and the message is routed to its destination. In other words, at block 815 conventional message routing is performed.

On the other hand, when (as with message 900) the subscriber type indicator of the addressee is "target", server 116 performs block 820 rather than block 815. At block 820, server 116 is configured to determine whether or not to respond autonomously to the message. In some embodiments, server 116 can determine, prior to block 820, whether to route the message to another server, which will perform the remainder of method 800. In the present embodiment, it is assumed that server 116 performs all message processing for target-type subscribers, and thus such a determination is omitted.

The determination at block 820 can take various forms. In some embodiments, the determination can be based on the currently available computational resources of server 116. For example, when the available computational resources of server 116 (e.g. a percentage of unused CPU cycles) fall below a predetermined threshold, the determination at block 820 may be selected as "no" to reduce the computational demands on server 116. In other embodiments, server 116 can be configured to respond to a predetermined portion of messages addressed to a given subscriber autonomously, while directing the remainder for human response. The portion can be stored in database 242, for example. In further embodiments, autonomous responding functionality can be enabled or disabled on a per-subscriber basis. Thus, the determination at block 820 can involve retrieving an indication from database 242 of whether autonomous response is enabled for the destination subscriber.

When the determination at block 820 is affirmative, server 116 is configured to proceed to block 825. At block 825, server 116 is configured to retrieve the keywords and corresponding response messages corresponding to the destination subscriber from database 246. In the present example, at block 825 server 116 therefore retrieves the contents of Table 2 as shown above.

At block 830, server 116 is configured to select one of the responses retrieved at block 825. As seen in Table 2, each response corresponds to a keyword. Server 116 is configured to determine whether the message body contains any of the keywords retrieved at block 825, and when the message body does contain a keyword, to select a response corresponding to that keyword. When no keywords match the message body, server 116 can be configured to select one of the retrieved responses, for instance at random.

In some embodiments, more complex autonomous response processing may be performed by server 116 or an associated server, such as the processing described in Applicant's PCT Publication No. WO2015/085404 (filed Dec. 12, 2014) and entitled "Method, system and apparatus for configuring a chatbot," the contents of which is incorporated herein by reference.

It is also contemplated that in some embodiments, block 820 can be performed after blocks 825 and 830 (or any other autonomous response processing) have been performed, rather than before such processing. In such embodiments, server 116 can be configured to determine at block 820 whether a suitable autonomous response has been selected. When no suitable response has been selected (e.g. when no keyword match with the message body is detected), the determination at block 820 is negative.

Following the selection of a response at block 835, server 116 is configured, at block 835, to send the selected response to the originator of the message received at block 805. Thus, in the present example, at block 835 server 116 may send the response "What kind of anvil do you need?" addressed to the subscriber "Bob", based on a match of the keyword "anvil" in message 900. It will now be apparent to those skilled in the art that server 116 itself processes the routing of the return message via another performance of method 800.

Returning to block 820, when the determination of whether to respond autonomously is negative, server 116 is configured to proceed to block 840. At block 840, server 116 is configured to present the incoming message (that is, message 900 in the present example) on a display. The display can be display 258, or any other suitable display. The display need not be directly connected to server 116. For example, the display can be connected to another device (not shown in FIG. 1) connected to server 116 via network 108. Database 242 may contain secondary routing information identifying such a device.

At block 840, server 116 is configured to receive input data defining a response message to the message received at block 805. The input data can be received at processor 230 from keyboard 254, or from a separate input device connected to a secondary computing device, as mentioned above in connection with block 840. Following the receipt of the input data, server 116 is configured to send the response message at block 835, as described above. It is also contemplated that when blocks 840 and 845 are performed, the input data can be incorporated into database 246 for use in future automated responses.

Following the transmission of the response at block 835, server 116 can be configured to perform block 850. At block 850, server 116 can be configured to update the subscriber record of the sender of the message received at block 805. For example, server 116 can store, in memory 234 (e.g. in database 242), update parameters corresponding to each target-type subscriber record. In general, the update parameters permit server 116 to update the subscriber records of any subscribers that send messages to the target-type subscriber. In some embodiments, the update parameters can define an account balance adjustment, such as a number of points, as well as adjustment criteria defining when to apply the adjustment. For example, the update criteria can specify a frequency in connection with the adjustment (e.g. apply the adjustment once for every message addressed to the target-type subscriber).

At block 850, therefore, server 116 is configured to retrieve the update parameters from memory 234, and determine whether to apply the adjustment to the subscriber record that sent the message received at block 805 (the subscriber "Bob" in the present example). When the determination is affirmative, server 116 updates the relevant subscriber record in database 242. Table 3 below shows an updated version of database 242 following the performance of block 850. In particular, the account balance of the subscriber "Bob" has been increased. In some embodiments, server 116 can also be configured to transmit a further message to the subscriber whose record has been adjusted, advising the subscriber of the adjustment.

TABLE 3

Updated Example Subscriber Database 242

| Subscriber Identifier | Subscriber Type | Routing | Contact IDs | Account Balance |
|---|---|---|---|---|
| Alice | Initiator | 104a | Acme_Inc | 0 |
| Bob | Initiator | 104b | Acme_Inc | 50 |
| Acme_Inc | Target | 116 | Alice, Bob | N/A |
| ... | ... | ... | ... | ... |

Figure 10:
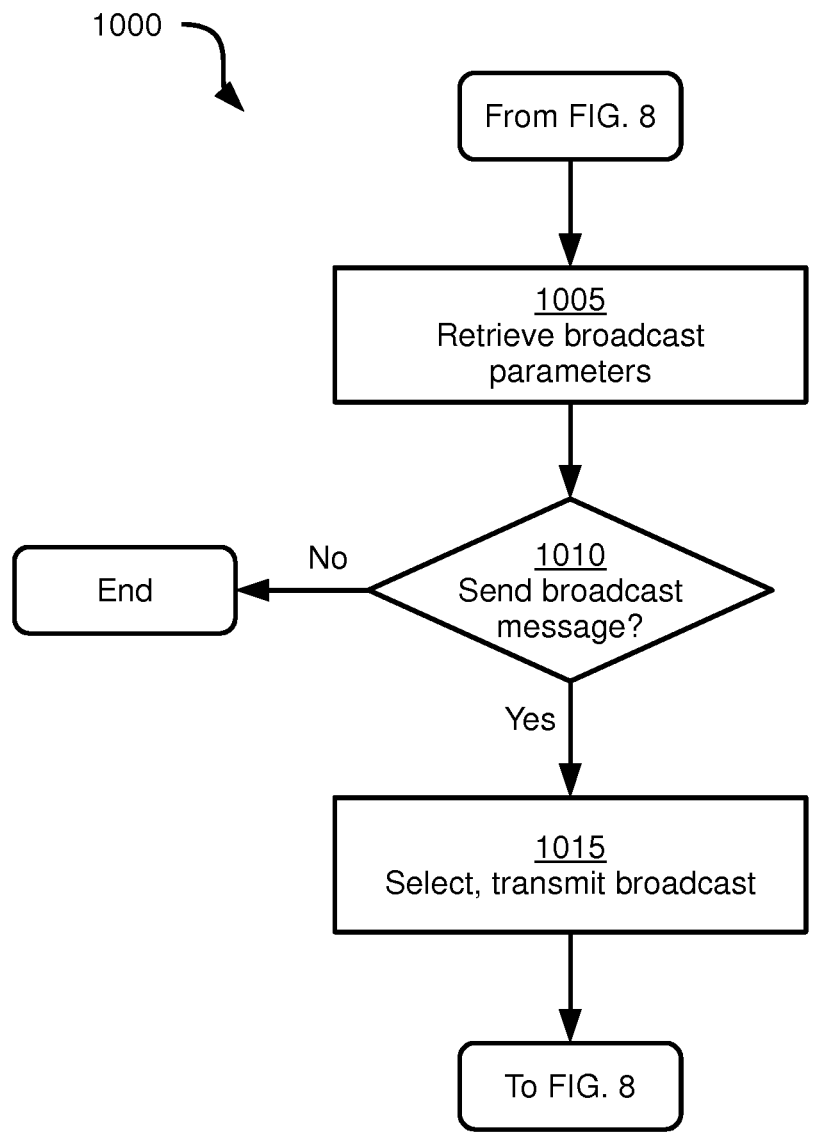
FIG. 10 depicts a method of generating broadcast messages in the system of FIG. 1, according to a non-limiting embodiment.

Following the updating of the subscriber record of the originator of the message received at block 805, server 116 can be configured to proceed to the method illustrated in FIG. 10. In other embodiments, however, server 116 can be configured to await a further selection of a subscriber identifier (see FIG. 6) or the receipt of a further message (FIG. 8).

It will also be noted above that the contacts fields for the subscribers Bob and Acme_Inc have been updated in Table 3. As noted earlier, server 116 can be configured to append the identifier of any subscriber from whom a message is received to the subscriber record of the message's destination. Similarly, the sender's subscriber record can also be updated to add the subscriber identifier of the destination.

FIG. 10 depicts a method 1000 of generating broadcast messages. Method 1000 will be discussed in connection with its performance in system 100, and particularly by server 116. Although method 1000 is illustrated as following the performance of method 800, in other embodiments method 1000 can be performed independently of method 800.

At block 1005, server 116 is configured to retrieve broadcast parameters from memory 234. In general, the broadcast parameters define criteria according to which broadcast messages are sent by server 116 on behalf of each target-type subscriber. Table 4, below, illustrates example broadcast parameters stored in database 242 in connection with the subscriber Acme_Inc (previously discussed subscriber data such as subscriber type, routing information and account balance are not shown below for legibility).

TABLE 4

Updated Example Subscriber Database 242

| Subscriber Identifier | Contact ... IDs | Broadcast frequency | Most Recent Broadcast | Broadcast Destination |
|---|---|---|---|---|
| Alice | ... Acme_Inc | N/A | N/A | N/A |
| Bob | ... Acme_Inc | N/A | N/A | N/A |
| Acme_Inc | ... Alice, Bob | Weekly | Aug. 1, 2015 | All contacts |
| ... | ... ... | ... | ... | ... |

In the above example, each target-type subscriber record can include a broadcast frequency, a timestamp indicating the date and time of the most recent broadcast message sent, and a broadcast destination field. At block 1005, therefore, server 116 is configured to retrieve the above-mentioned parameters. When a plurality of target-type subscriber records are maintained in database 242, block 1005 (and indeed, the entirety of method 1000) can be performed independently for each target-type subscriber.

At block 1010, server 116 is configured to determine whether to send a broadcast message based on the parameters retrieved at block 1005. For example, server 116 can be configured to determine whether the time period defined by the "broadcast frequency" parameter has elapsed since the most recent broadcast. When the determination is negative, the performance of method 1000 ends. When the determination is affirmative, however, the performance of method 1000 proceeds to block 1015.

At block 1015, server 116 is configured to select a broadcast message and transmit the broadcast message to each of the destinations specified in the "broadcast destination" parameter retrieved at block 1005. The broadcast message can be selected from one or more preconfigured messages stored in memory 234 in connection with the target-type subscriber record (e.g. in database 242). Having transmitted the broadcast message, server 116 can then return to FIG. 8 to process any incoming messages, which may include those responding to the broadcast message.

Variations to the above systems and methods are contemplated. For example, in some embodiments, rather than present a message on a display at block 820 only when the determination at block 820 is not to respond autonomously, server 116 can be configured to always present the message on a display, and to then respond autonomously if no input data is received (block 845) within a configurable time period.

The scope of the claims should not be limited by the embodiments set forth in the above examples, but should be given the broadest interpretation consistent with the description as a whole.

We claim:

1. A method of initiating communications, comprising:
   storing, in a memory at a messaging server, a plurality of subscriber records, each subscriber record containing (i) a subscriber identifier, (ii) routing information for routing messages addressed to the subscriber identifier from the messaging server to a computing device corresponding to the subscriber identifier, and (iii) a subscriber type indicator; a first subset of the subscriber records having a first subscriber type indicator, and a second subset of the subscriber records having a second subscriber type indicator;
   determining, at the messaging server, whether to generate initiation data;
   when the determination is affirmative:
      selecting at least one of the second subset of the subscriber records;
      generating the initiation data, the initiation data including at least the subscriber identifier of the selected subscriber record; and
      transmitting the initiation data from the messaging server to a computing device corresponding to at least one of the first subset of subscriber records.

2. The method of claim 1, wherein the determination comprises:
   determining whether a request has been received at the messaging server from the computing device.

3. The method of claim 2, the initiation data further comprising an instruction for causing the computing device to initiate a message exchange with the messaging server.

4. The method of claim 1, further comprising:
   storing, in association with each subscriber record of the second subset, at least one keyword.

5. The method of claim 4, further comprising:
   determining whether a selection of a subscriber identifier has been received from the computing device;
   when the determination is affirmative:
      retrieving the subscriber indicator type of the selected subscriber identifier;
      when the subscriber indicator type of the selected subscriber identifier is the second subscriber indicator type, retrieving the at least one keyword corresponding to the selected subscriber identifier from the memory; and
      transmitting the at least one keyword to the computing device.

6. The method of claim 4, further comprising:
   receiving a message from the computing device; the message containing a destination subscriber identifier;
   retrieving the subscriber type indicator of the destination subscriber identifier;
   when the subscriber type indicator is the second subscriber type indicator:
      determining whether to respond to the message autonomously.

7. The method of claim 6, further comprising:
   storing; in association with the at least one keyword, at least one response message;
   when the determination of whether to respond to the message autonomously is affirmative:
      retrieving the at least one keyword and the at least one response message;
      determining whether the message contains the at least one keyword; and
      when the message contains the at least one keyword, sending the response message to the computing device.

8. The method of claim 7, further comprising:
   responsive to receiving the message, storing the subscriber identifier corresponding to the computing device in a contacts field associated with the destination subscriber identifier.

9. The method of claim 7, further comprising:
   responsive to receiving the message, updating the subscriber record corresponding to the computing device.

10. The method of claim 9, wherein updating the subscriber record corresponding to the computing device comprises updating an account balance.

11. A messaging server, comprising:
    a memory storing a plurality of subscriber records, each subscriber record containing (i) a subscriber identifier, (ii) routing information for routing messages addressed to the subscriber identifier from the messaging server to a computing device corresponding to the subscriber identifier, and (iii) a subscriber type indicator; a first subset of the subscriber records having a first subscriber type indicator, and a second subset of the subscriber records having a second subscriber type indicator;
    a network interface; and
    a processor interconnected with the memory and the network interface, the processor configured to:
       determine whether to generate initiation data;
       when the determination is affirmative:
          select at least one of the second subset of the subscriber records;
          generate the initiation data, the initiation data including at least the subscriber identifier of the selected subscriber record; and
          transmit the initiation data from the message server to a computing device corresponding to at least one of the first subset of subscriber records.

12. The messaging server of claim 11, wherein the determination comprises:
    determining whether a request has been received at the messaging server from the computing device.

13. The messaging server of claim 12, the initiation data further comprising an instruction for causing the computing device to initiate a message exchange with the messaging server.

14. The messaging server of claim 11, the memory storing, in association with each subscriber record of the second subset, at least one keyword.

15. The messaging server of claim 14, the processor further configured to:
    determine whether a selection of a subscriber identifier has been received from the computing device;
    when the determination is affirmative:
       retrieve the subscriber indicator type of the selected subscriber identifier;
       when the subscriber indicator type of the selected subscriber identifier is the second subscriber indicator type, retrieve the at least one keyword corresponding to the selected subscriber identifier from the memory; and
       transmit the at least one keyword to the computing device.

16. The messaging server of claim 14, the processor further configured to:
- receive a message from the computing device; the message containing a destination subscriber identifier;
- retrieve the subscriber type indicator of the destination subscriber identifier;
- when the subscriber type indicator is the second subscriber type indicator:
  - determine whether to respond to the message autonomously.

17. The messaging server of claim 16, the memory storing, in association with the at least one keyword, at least one response message;
- the processor further configured, when the determination of whether to respond to the message autonomously is affirmative, to:
  - retrieve the at least one keyword and the at least one response message;
  - determine whether the message contains the at least one keyword; and
  - when the message contains the at least one keyword, sending the response message to the computing device.

18. The messaging server of claim 17, processor further configured to:
- responsive to receiving the message, store the subscriber identifier corresponding to the computing device in a contacts field associated with the destination subscriber identifier.

19. The messaging server of claim 17, processor further configured to:
- responsive to receiving the message, update the subscriber record corresponding to the computing device.

20. The messaging server of claim 19, the processor further configured to update the subscriber record corresponding to the computing device by updating an account balance.

* * * * *